United States Patent
Morris et al.

(10) Patent No.: US 7,697,470 B2
(45) Date of Patent: *Apr. 13, 2010

(54) UTILIZATION OF THE INTERNET PROTOCOL TO FACILITATE COMMUNICATION INVOLVING MOBILE DEVICES

(75) Inventors: Martin Morris, San Diego, CA (US); Rajiv Kumar, San Diego, CA (US); Lyn Nguyen, San Diego, CA (US); Hiep Pham, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1339 days.

This patent is subject to a terminal disclaimer.

(21) Appl. No.: 11/024,898

(22) Filed: Dec. 29, 2004

(65) Prior Publication Data

US 2005/0141442 A1 Jun. 30, 2005

Related U.S. Application Data

(63) Continuation of application No. 09/347,374, filed on Jul. 6, 1999, now Pat. No. 6,891,820.

(51) Int. Cl.
*H04W 4/00* (2009.01)
(52) U.S. Cl. .................. 370/328; 370/394; 370/400; 370/401; 370/465
(58) Field of Classification Search ............. 370/465, 370/401, 400, 394, 293, 392, 256, 342, 338, 370/335, 331, 329, 287, 94.3, 94.1, 85.13; 455/432, 436
See application file for complete search history.

(56) References Cited

U.S. PATENT DOCUMENTS 4,879,740 A * 11/1989 Nagashima et al. ......... 455/462
5,331,634 A *  7/1994 Fischer ...................... 370/405
5,339,316 A *  8/1994 Diepstraten ................. 370/401

(Continued)

FOREIGN PATENT DOCUMENTS

EP             0695059 A1     1/1996

(Continued)

OTHER PUBLICATIONS

Bluetooth Adopter's website: "Specification of the Bluetooth System," v.0.8, 01 22 99, pp. 1-224.

(Continued)

*Primary Examiner*—Ayaz R Sheikh
*Assistant Examiner*—Andrew C Lee
(74) *Attorney, Agent, or Firm*—McAndrews, Held & Malloy, Ltd.

(57) ABSTRACT

A data communication system capable of forwarding IP-addressed data to devices as such devices move among networks having different IP addresses is disclosed herein. The system includes first and second networks containing first and second pluralities of nodes. At least one of the first plurality of nodes is adapted to receive data transmissions from an external IP-based network. Upon joining the first network, this device is assigned an IP address which remains with it irrespective of whether it moves beyond the range of the first network. When this device roams into the vicinity of the second network, data addressed to the device which is received at the first network is forwarded via at least one node of the second network to the roaming device.

21 Claims, 3 Drawing Sheets

U.S. PATENT DOCUMENTS

| | | | | |
|---|---|---|---|---|
| 5,371,738 | A | * | 12/1994 | Moelard et al. ............ 370/331 |
| 5,412,654 | A | * | 5/1995 | Perkins ................ 370/312 |
| 5,465,392 | A | * | 11/1995 | Baptist et al. ............ 370/310 |
| 5,490,139 | A | | 2/1996 | Baker et al. |
| 5,504,746 | A | * | 4/1996 | Meier ................... 370/256 |
| 5,572,528 | A | * | 11/1996 | Shuen ................... 370/402 |
| 5,594,731 | A | * | 1/1997 | Reissner ................ 370/338 |
| 5,615,212 | A | * | 3/1997 | Ruszczyk et al. ......... 370/433 |
| 5,623,495 | A | * | 4/1997 | Eng et al. ............... 370/397 |
| 5,636,216 | A | | 6/1997 | Fox et al. |
| 5,652,751 | A | | 7/1997 | Sharony |
| 5,654,959 | A | * | 8/1997 | Baker et al. ............. 370/331 |
| 5,678,531 | A | | 10/1997 | Byers et al. |
| 5,696,903 | A | * | 12/1997 | Mahany .................. 709/228 |
| 5,699,353 | A | | 12/1997 | Kent |
| 5,708,655 | A | | 1/1998 | Toth et al. |
| 5,737,328 | A | * | 4/1998 | Norman et al. ........... 370/331 |
| 5,742,598 | A | | 4/1998 | Dunn et al. |
| 5,748,619 | A | * | 5/1998 | Meier ................... 370/278 |
| 5,754,547 | A | * | 5/1998 | Nakazawa ................ 370/401 |
| 5,768,531 | A | * | 6/1998 | Lin ..................... 709/242 |
| 5,812,531 | A | * | 9/1998 | Cheung et al. ........... 370/255 |
| 5,822,361 | A | * | 10/1998 | Nakamura et al. ......... 375/133 |
| 5,825,772 | A | | 10/1998 | Dobbins et al. |
| 5,835,061 | A | | 11/1998 | Stewart |
| 5,844,900 | A | * | 12/1998 | Hong et al. ............. 370/342 |
| 5,845,081 | A | | 12/1998 | Rangarajan et al. |
| 5,850,592 | A | | 12/1998 | Ramanathan |
| 5,850,593 | A | * | 12/1998 | Uratani ................. 455/11.1 |
| 5,854,899 | A | | 12/1998 | Callon et al. |
| 5,862,142 | A | * | 1/1999 | Takiyasu et al. ......... 370/480 |
| 5,881,095 | A | * | 3/1999 | Cadd .................... 375/132 |
| 5,987,011 | A | * | 11/1999 | Toh ..................... 370/331 |
| 5,991,287 | A | * | 11/1999 | Diepstraten et al. ...... 370/338 |
| 6,031,830 | A | * | 2/2000 | Cowan ................... 370/338 |
| 6,208,635 | B1 | * | 3/2001 | Altvater et al. ......... 370/343 |
| 6,307,843 | B1 | * | 10/2001 | Okanoue ................. 370/312 |
| 6,434,134 | B1 | * | 8/2002 | La Porta et al. ......... 370/338 |
| 6,473,413 | B1 | * | 10/2002 | Chiou et al. ............ 370/331 |
| 6,515,974 | B1 | * | 2/2003 | Inoue et al. ............ 370/331 |
| 6,560,443 | B1 | * | 5/2003 | Vaisanen et al. ......... 455/73 |
| 6,574,266 | B1 | * | 6/2003 | Haartsen ................ 375/133 |
| 6,665,718 | B1 | * | 12/2003 | Chuah et al. ............ 709/225 |
| 6,765,896 | B1 | * | 7/2004 | Ahmed et al. ............ 370/338 |
| 6,947,398 | B1 | * | 9/2005 | Ahmed et al. ............ 370/331 |
| 7,184,413 | B2 | * | 2/2007 | Beyer et al. ............ 370/254 |
| 7,558,557 | B1 | * | 7/2009 | Gollnick et al. ......... 455/343.4 |

FOREIGN PATENT DOCUMENTS

WO     WO 99/14897     3/1999

OTHER PUBLICATIONS

Geneseo.edu—website: "PMDF System Manager's Guide—PMDF-REF-5.1; Overview of PMDF," pp. 1 of 1; 1 of 2 and 2 of 2, Aug. 1997.
Haartsen, Jaap, "Bluetooth-The Universal Radio Interface for *ad hoc*, wireless Connectivity," *Ericsson Review*, No. 3, 1998, pp. 110-117.
"Specification of the Bluetooth System, Core, Version 1.0B," *Bluetooth SIG Specifications*, Dec. 1, 1999, pp. 18-42.

* cited by examiner

UTILIZATION OF THE INTERNET PROTOCOL TO FACILITATE COMMUNICATION INVOLVING MOBILE DEVICES

CROSS REFERENCE TO RELATED PATENT APPLICATIONS

This application is a continuation of U.S. application Ser. No. 09/347,374 filed Jul. 6, 1999 now U.S. Pat. No. 6,891,820, which is hereby incorporated herein by reference in its entirety. The entire disclosures of U.S. patent application entitled "Distributed Management of an Extended Network Containing Short-Range Wireless Links" and U.S. patent application entitled "Implementation of Power Control in a Wireless Overlay Network", both filed on Jul. 6, 1999, are incorporated herein by reference in their entirety.

FIELD OF THE INVENTION

The present invention relates generally to communication systems, and more particularly to a method and associated apparatus for allowing a device to continue communication via the Internet Protocol ("IP") even while moving among networks having different associated IP addresses.

BACKGROUND OF THE INVENTION

Computer networks allow multiple computers, peripherals and other information storage, retrieval or processing devices to share data. Each device attached to a network is typically referred to as a node on the network, or a node that is part of the network. Local Area Networks ("LANs") have historically consisted of nodes interconnected by physical telecommunications media (e.g., coaxial cable, twisted pair wire, or fiber optics). Recently wireless LANs, the nodes of which are not connected by means of a physical medium, have started to appear in the market. These wireless LANs communicate by means of infra-red (IR), radio or other signals. One of the benefits of using wireless LANs is that cabling is not required. This is a particularly useful feature for mobile nodes such as laptop and notebook computers, PDAs (personal digital assistants), and the like. If equipped with an appropriate wireless adapter, the mobile nodes can move around within a predefined coverage area and remain connected to the network.

In order for the nodes of a particular network to be able to communicate with each other, some sort of common addressing scheme must be implemented. In a traditional wired network, one very common method of communicating between nodes is to utilize Internet Protocol ("IP") addressing. When a node initially joins a network operating with the Internet Protocol, it is assigned an IP address consisting of at least two portions: a network address and a destination address. IP addresses are typically fixed and remain with the node irrespective of whether the node relocates to another network. In a traditional wired network, the fixed nature of IP addresses is not problematic because nodes are stationary and consequently do not migrate to networks outside of their original home network. Recently, wireless nodes have been added to traditionally hard-wired networks. Like all devices adhering to the Internet Protocol, mobile devices are accorded IP addresses having a network portion and a device portion. The network portion identifies the mobile device's "home network" while the device portion distinguishes the mobile device from other members of its home network. The routing of data packets through the Internet is generally exclusively based upon the network portion of the destination IP address. Specifically, Internet routers extract the destination network address from a given data packet and then forward that packet to the appropriate network. Once the packet reaches the appropriate network, the network server examines the device portion of the IP address and forwards the packet to the appropriate device.

When a mobile device is located in its home network, data packets addressed to a particular mobile device are simply sent to such device upon being received at the home network's access point. This process is transparent to the user so long as the mobile unit is located within range of its home network. However, when the mobile device travels outside of its home network data packets cannot easily be forwarded thereto and are often "dropped", which results in loss of data.

Several methods have been proposed to allow mobile devices to continue IP-based communication even when moving between networks having different IP addresses. One such technique requires that the mobile unit report changes in its address to the access point or network manager in its home network. A router located in its home network stores each new IP address for the mobile unit and forwards any incoming packets to the mobile device's new IP address. An alternate approach involves establishing a pseudo presence, also called a "spoofed address," at the mobile's home network location. However, when mobile devices frequently move between networks having different IP addresses, these address-mapping and forwarding techniques can result in packets being forwarded to multiple locations, which may cause confusion and loss of data.

SUMMARY OF THE INVENTION

Briefly, therefore, the present invention relates to a data communication system capable of forwarding IP-addressed data to devices as such devices move among networks having different IP addresses. The present invention includes first and second networks containing first and second pluralities of nodes. At least one of the first plurality of nodes is adapted to receive data transmissions from an external IP-based network. Upon joining the first network, this device is assigned an IP address which remains with it irrespective of whether it moves beyond the range of the first network (i.e., the device's "home" network). When this device roams into the vicinity of the second network, data addressed to the device which is received at the first network is forwarded via at least one node of the second network to the roaming device.

In a preferred embodiment, each of the nodes in the first and second networks broadcast messages indicating the services that it offers and the nodes that are within its range. These broadcasts allow the mobile device to determine which devices it can use to create a connection between itself and the local access point in its home network. When the mobile device moves beyond its home network, it reestablishes a connection to its local access point using whatever combination of nodes it deems as being most efficient. Once this connection is made, the local access point is able to forward data to the mobile device.

In an alternate embodiment, an internetworking node participates in both the first and second networks, and receives a first set of network information relating to the first network from the first plurality of nodes. In an another embodiment, the mobile device is capable of anticipating when it is about to lose contact with one of the nodes that is providing a connection between it and its home local access point. When the mobile device makes this determination, it attempts to establish an alternative route for the connection to its local access point. If the mobile device is of a type requiring continuous connection to an external network, an additional embodiment allows the mobile device to simultaneously maintain more than one connection between itself and its local access point. This minimizes the risk that data packets addressed to the mobile device will be "dropped".

DETAILED DESCRIPTION OF THE INVENTION

The present invention is more fully described with reference to FIGS. 1-3. An exemplary implementation of the invention is discussed and illustrated with reference to its implementation using wireless networks predicated on the proposed "Bluetooth" wireless communications protocol. This protocol contemplates the grouping of physically proximate wireless nodes, and is described in *Specification of the Bluetooth System*, v0.8, Jan. 22, 1999 (and in subsequent revisions thereof). It should be understood that this invention is not limited to such a wireless protocol, and could be similarly implemented using other types of fixed or wireless networks. As is described hereinafter, the present invention discloses a method and apparatus for relaying data addressed to a mobile device nominally associated with a first network when such device becomes associated with other networks.

Figure 1:
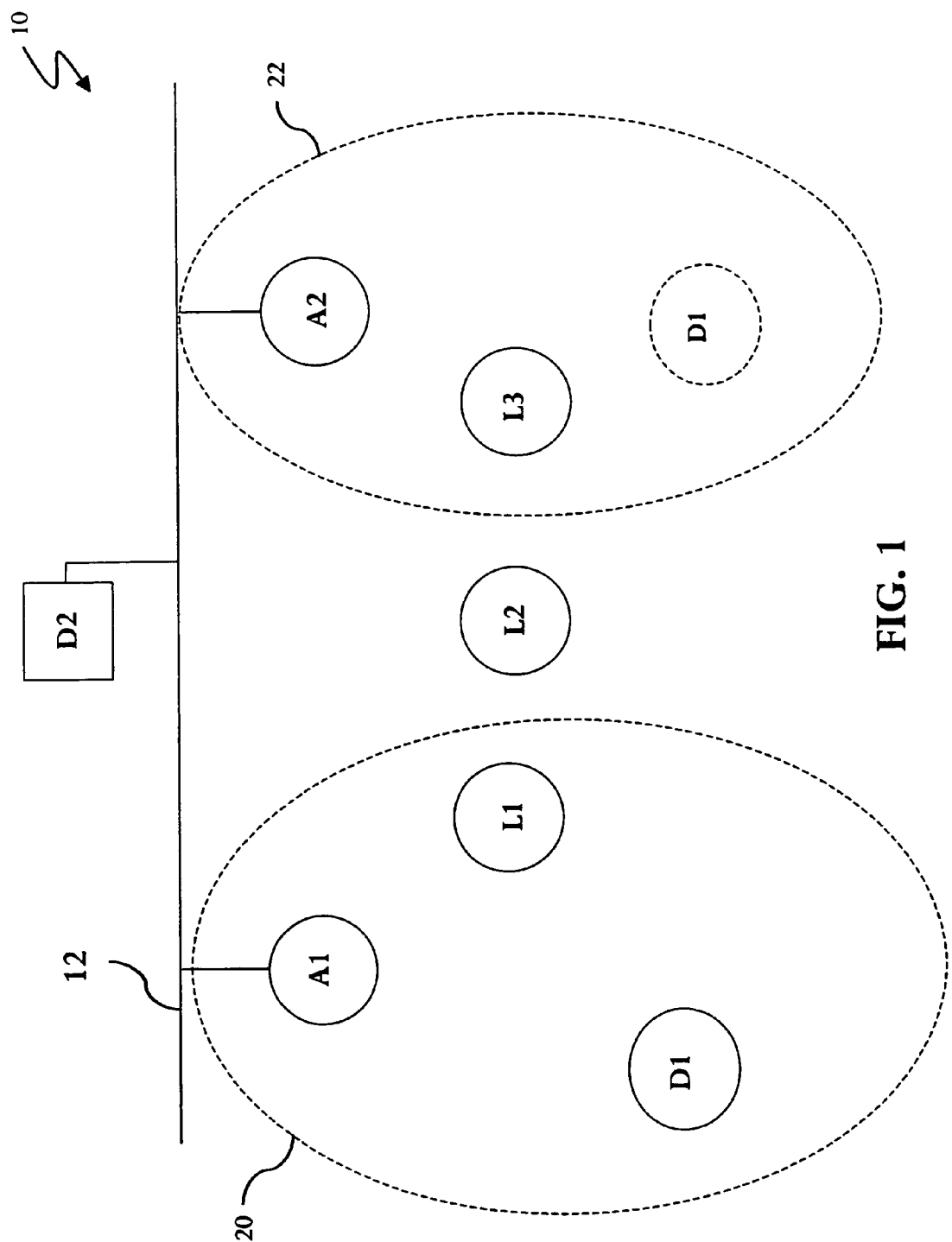
FIG. 1 shows a data communication system comprising two wireless networks and a means for forwarding data between the networks.

FIG. 1 illustrates a data communication system 10 consisting of a hard-wired network 12 and first and second wireless networks 20 and 22 containing network nodes A1 and A2, respectively. The first and second wireless networks 20 and 22 each contain a plurality of wireless nodes. For purposes of clarity, only wireless nodes L1 and L3 are depicted in wireless networks 20 and 22. It should nonetheless be understood that the present invention is equally applicable to implementations in which first and second wireless networks include numerous wireless nodes. The system 10 also contains a relay node L2 connecting the two wireless networks, a first mobile device D1, and a hard-wired device D2 connected to the hard-wired network 12. In a typical configuration, D2 would actually be a network of devices rather than a single device. The device D2 may comprise either a network of devices or simply a single device. Since the actual number of devices represented by D2 is irrelevant for purposes of explanation of the present invention, device D2 will hereinafter be referred to as a single device.

For purposes of illustration, it is assumed that certain of the wireless nodes depicted in FIG. 1 are mobile relative to one another. In the network architecture of FIG. 1, each node within the first network 20 is within the wireless coverage area of network access node A1 and each node within the second network 22 is within the wireless coverage area of network access node A2. The network access nodes A1 and A2 serve as conduits to the external network 12 for the first and second wireless networks 20 and 22, respectively. The access nodes A1 and A2, as well as a relay node L2, are also disposed for wireless communication with the nodes L1 and L3.

Because the nodes within the wireless networks 20 and 22 are not necessarily within transmission range of all the other wireless nodes within the same networks, each wireless node may not be able to monitor all of the traffic within its network. For example, wireless node L1 may be able to "listen" to wireless node L2 but may not be able to monitor transmissions from wireless node L3. In a preferred implementation each wireless node transmits an advertisement identifying its address and the services it offers. Each such advertisement also incorporates the address of all other wireless nodes from which advertisements are received by the node transmitting a given advertisement. Based on this information, the mobile device D1 can determine all nodes participating in the networks and the service offered by each. As used herein the term "services" encompasses, without limitation, the capability of a given node to relay message information to and from one or more outside networks. Accordingly, the advertisement issued by each wireless node may also identify the other networks within which the wireless node is capable of communication and the services offered by each.

Referring to FIG. 1, when D1 first seeks to join the first wireless network 20 it transmits a signal to the network access node A1 via wireless node L1 so that it can be assigned an IP address by the Internet Service Provider ("ISP") providing network access via node A1. Through this transmission, device D1 establishes the first wireless network 20 as its home network; that is, it designates the network address of the first wireless network 20 as its network address. Because device D1 is not hard-wired to node A1, it is necessary for device D1 to access node A1 via a wireless communication link. In the exemplary implementation of FIG. 1, device D1 determines that it can establish a connection to node A1 through node L1 by listening to the periodic advertisements issued by nodes A1 and L1. As was mentioned above, these broadcasts contain network connectivity information pertinent to of all of the devices within range of A1 and L1. For example, A1's broadcast would indicate that it is connected to the hard-wired network 12, and is capable of communication with nodes L1 and L2. Similarly, node L1's broadcast would reveal that it is within range of, and capable of communication with, nodes A1, L2 and D1.

Data may be routed to node D1 in a conventional manner when node D1 is within its home network 20. In this situation data destined for node D1 is sent to the IP address of node A1 from the external network 12. On the basis of the advertisements broadcast by L1, node A1 determines that node L1 has established a connection to D1. Node A1 then sends the data received from the external network 12 to node D1 via node L1.

Routing data to D1 using IP addressing becomes problematic when D1 moves outside of its home network 20, since node D1's IP address does not automatically change to reflect its new location within a different network. As a consequence, all the data intended to be sent to node D1 will continue to be routed over the external network 12 to node A1. If node A1 does not have a separate connection to device D1 when data packets arrive, node A1 will either drop the data packets or queue them for retransmission on the assumption that D1 will establish a new connection with A1.

Referring to FIG. 1, when D1 relocates to a position within the wireless coverage area of network 22 it listens to the connectivity information broadcast by the nodes within its range (device D1 is shown in phantom in network 22). If device D1 becomes located sufficiently near node L3, it may listen to its connectivity advertisement and determine a path over which data may be routed from node A1. After making this determination, D1 requests a connection to node A1 via a node along the chosen path (e.g., node L3). In order to establish a connection between nodes D1 and A1, node L3 establishes a connection to node L2 which in turn establishes a connection to node A1. Once these connections have been made, node A1 will forward any data packets addressed to D1 that it has received over the hard-wired network 12.

Figure 2:
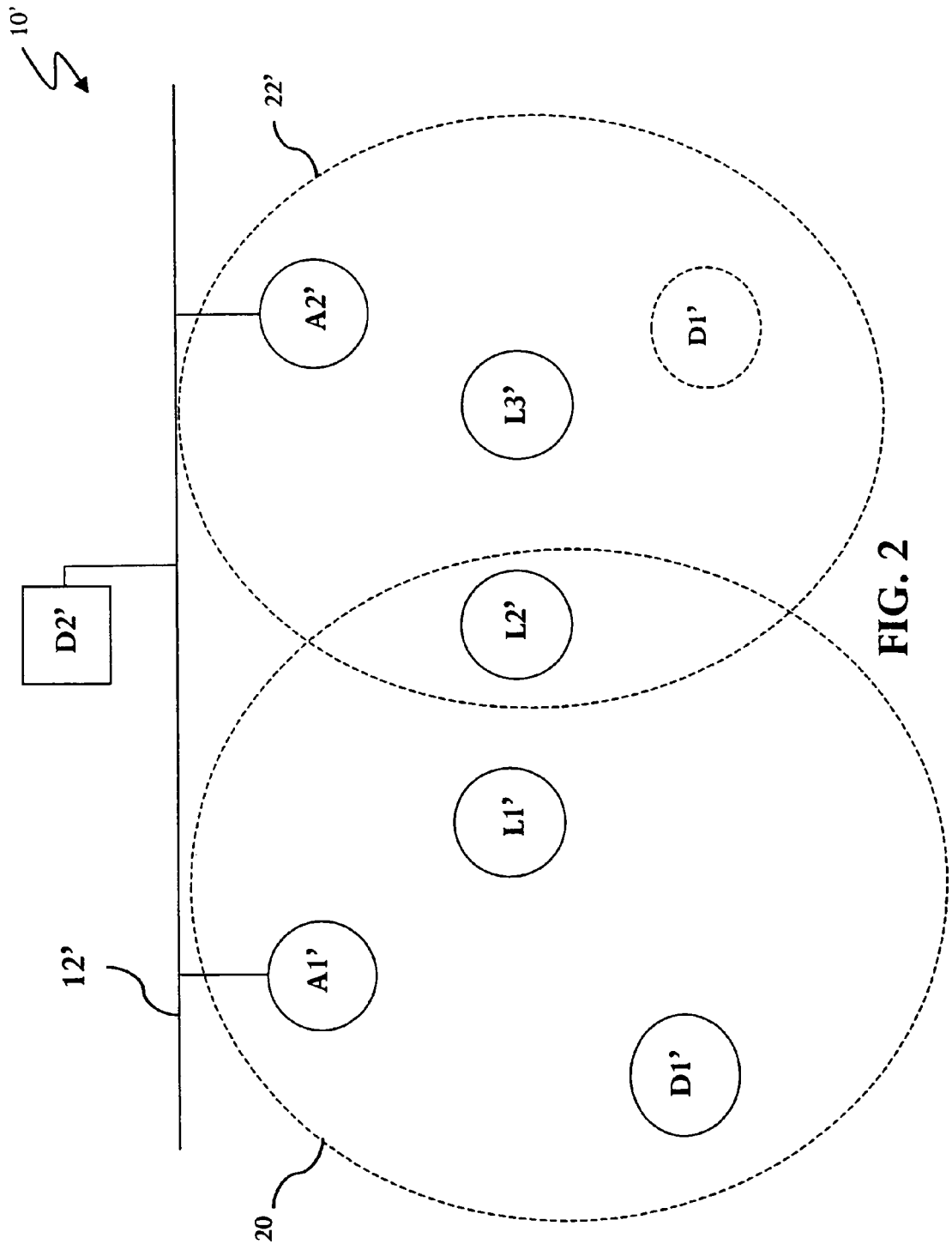
FIG. 2 contains a data communication system consisting of two wireless networks and an internetworking node in accordance with a preferred embodiment of the present invention.

FIG. 2 depicts an alternate embodiment of the present invention in which a wireless node L2' exists as a member of both first and second wireless networks 20' and 22'. The node L2' facilitates internetworking between the networks 20' and 22' in the manner described in the aforementioned copending Patent Application entitled "Distributed Management of an Extended Network Containing Short-Range Wireless Links". The wireless node L2', or "internetworking node", understands the protocols of both the first and second wireless networks 20' and 22' and is capable of transparently relaying data traffic therebetween.

Referring again to FIG. 2, once device D1' begins moving outside of its home network 20' it may anticipate the loss of its connection to the network access node A1'. This is because device D1' monitors the signal strength of the advertisements being transmitted from L1', and will take notice when this signal strength drops below a predefined threshold. Once device D1' determines that a dropped connection between itself and node L1'is imminent, it will "listen" to the advertisements being broadcast by other wireless nodes within its range to determine if it can establish a simultaneous connection to node A1'. In the exemplary implementation of FIG. 2, device D1' determines that it may establish communication with node A1' via node L2'. Accordingly, device D1' then drops its connection with L1' after establishing a connection with node L2'. In this way device D1' endeavors to minimize the risk of loss of data packets by briefly maintaining a simultaneous connection to two distinct wireless nodes. In applications where preventing any loss of data packets is very important, device D1' may maintain such a simultaneous connection continuously or for substantially longer periods of time.

Figure 3:
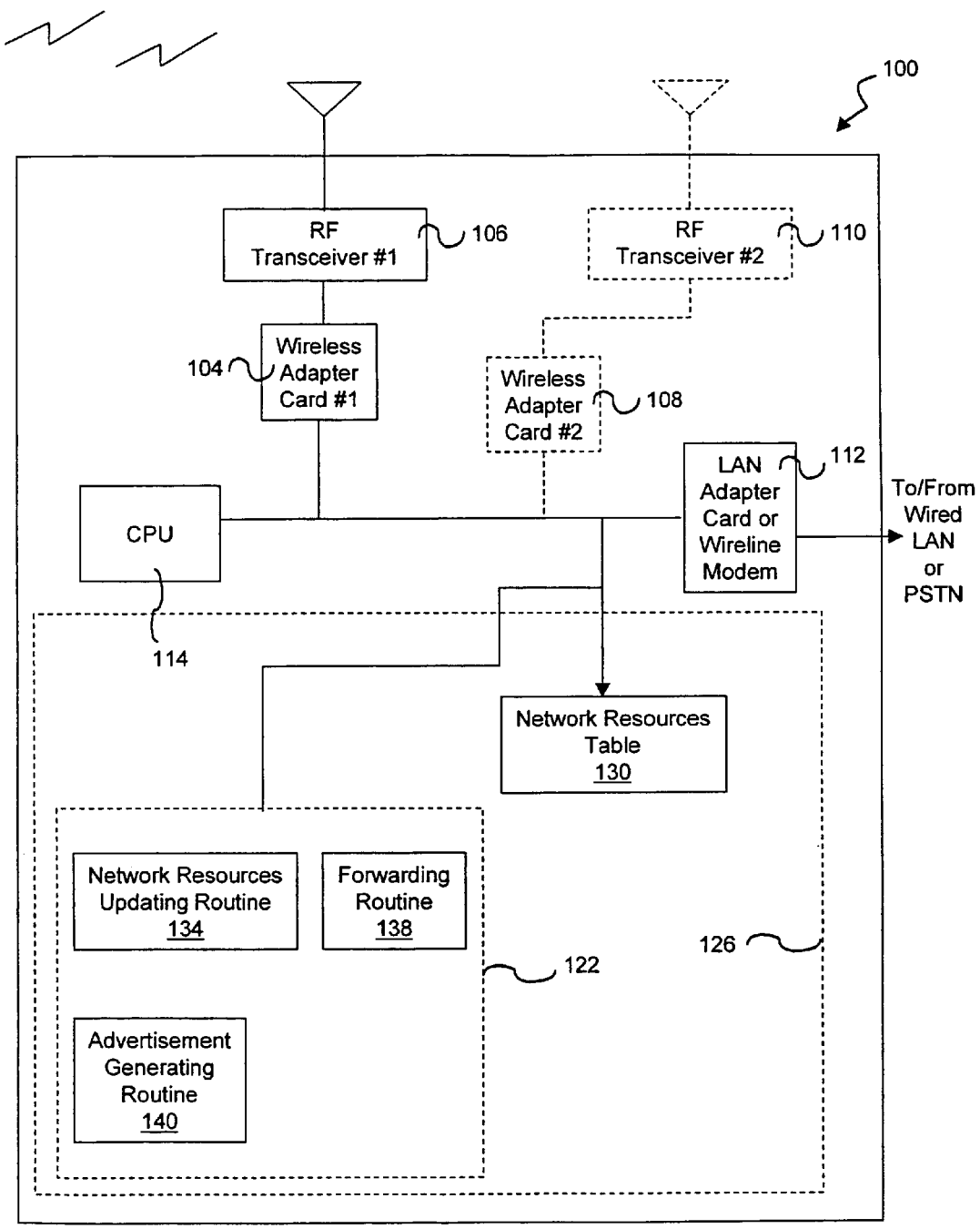
FIG. 3 is a block diagram illustratively representing the components of a wireless node and associated software configured in accordance with a preferred embodiment of the present invention.

FIG. 3 is a block diagram illustratively representing the components of a wireless node 100 and associated software configured in accordance with a preferred embodiment of the present invention. Referring to FIG. 3, the wireless node 100 may be in the form of an electronic device (e.g., a laptop or desktop computer, hand-held electronic organizer, or printer) containing a first wireless adapter card 104 and a first RF transceiver 106 disposed for communication in accordance with a first network communication standard. The wireless node 100 may also optionally include a second wireless adapter card 108 and a second RF transceiver 110 for communicating in accordance with a second network communication standard. The second wireless adapter card 108 and the second RF transceiver 110 may be included within the wireless node 100 when, for example, it is anticipated that the wireless node may participate in networks operative in accordance with different network standards. For example, internetworking node L2' would preferably be configured with different wireless transceivers and associated adapter cards to the extent the first network 20' and second network 22' were governed by differing network communication standards. The wireless node 100 may also include a LAN adapter card 112 for facilitating communication with a wired LAN, or alternately a wireline modem for effecting communication through the PSTN.

Each wireless adapter card and transceiver is controlled by a CPU 114 operative to execute program instructions of the various software routines 122 stored in memory 126. Within wireless nodes, a network resources table 130 is updated in response to internet management broadcasts by transmitting nodes of the individual wireless networks. The network resources table 130 stores the network address and services offered by each wireless node. In the case of internetworking node L2', these advertised services may include the services provided by a wireless node from a neighboring network in communication with the internetworking node.

Included among the software routines 122 within internetworking nodes is a forwarding routine 138 for forwarding messages to the wired LAN via the LAN adapter card 112, or to another wireless node via one of the wireless transceivers 106, 110 and associated wireless adapter card 104, 108. An advertisement generating routine 140 operates to generate the advertisements issued by the wireless node 100 which specify its network address and services offered.

Although the above application has been described primarily with reference to specific embodiments, one skilled in the art can readily appreciate that the teachings of the present invention may be applied in other communication contexts. For example, in certain embodiments the first and second wireless networks described above could instead comprise networks of fixed devices linked by hard-wired local area networks ("LANs"). Assuming a wireless or other communication link could be established between a pair of devices within the different networks, data could be forwarded among such networks in accordance with the invention upon movement of a device from one network to the other. Thus the application is meant only to be limited by the scope of the appended claims.

What is claimed is:

1. A data communication system, comprising:
   a hard-wired network;
   a first network comprising a first network access point and one or more first nodes, the first network access point being directly coupled to the hard-wired network, the one or more first nodes being in direct wireless communication with the first network access point; and
   a second network comprising a second network access point and one or more second nodes, the second network access point being directly coupled to the hard-wired network, the one or more second nodes being in direct wireless communication with the second network access point,
   wherein, when a mobile wireless communication device is within a wireless coverage area of the first network, the mobile wireless communication device establishes communication with the first network access point via the one or more first nodes,
   wherein, when the mobile wireless communication device is not within the wireless coverage area of the first network, the mobile wireless communication device establishes communication with the second network via the one or more second nodes and the mobile wireless communication device determines a wireless internetwork path over which communications can be routed from the first network access point,
   wherein message information received at the first network and addressed to the first wireless node is forwarded from the first network to the second network via the wireless internetwork path, and
   wherein the wireless internetwork path comprises one or more wireless connections involving at least one of the one or more first nodes and at least one of the one or more second nodes to the exclusion of the first network access point and the second network access point.

2. The data communication system according to claim 1, wherein the wireless internetwork path comprises an internetworking node included within the one or more first nodes and within the one or more second nodes.

3. The data communication system according to claim 2, wherein the internetworking node receives a first set of network information relating to the first network from the one or more first nodes, the first set of network information identifying the first network access point.

4. The data communication system according to claim 2, wherein the internetworking node transmits a first set of network information and an identity of the internetworking node to a particular second node of the one or more second nodes.

5. The data communication system according to claim 4, wherein the particular second node broadcasts the first set of network information, and
wherein the first wireless node receives the first set of broadcasted network information.

6. The data communication system according to claim 5, wherein the first wireless node determines the wireless internetwork path based, at least in part, on a connectivity advertisement broadcast by a first node of the one or more first nodes and an additional connectivity advertisement broadcast by a second node of the one or more second nodes.

7. The data communication system according to claim 1, wherein the message information is transmitted over a wireless connection of the one or more wireless connections.

8. A data communication system, comprising:
a first network comprising one or more first wireless nodes, and a first network access point, the one or more first wireless nodes being in wireless communication with the first wireless access point, the first network access point being directly coupled to a hard-wired network, the first network access point receiving message information directed to the first network over the hard-wired network;
a second network comprising a second network access point and one or more second wireless nodes, the second network access point being directly coupled to the hard-wired network, the one or more second wireless nodes being in wireless communication with the second network access point; and
an internetworking node,
wherein the internetworking node forwards portions of the message information addressed to one of the one or more first wireless nodes via a wireless interconnection path from the first network access point to the second network when the one of the one or more first wireless nodes establishes communication with the second network,
wherein the wireless internetwork path comprises a first wireless node of the one or more wireless nodes or a second wireless node of the one or more wireless nodes,
wherein the wireless internetwork path excludes the first network access point and the second network access points,
wherein a wireless mobile communication device roams out of a wireless coverage area of the first network and into a wireless coverage area of the second network, and
wherein the mobile wireless communication device determines a wireless internetwork path over which communications can be routed from the first network access point.

9. A data communication system, comprising:
a first wireless network comprising a first network access point and one or more first wireless nodes, the first network access being directly coupled to a wired network, the first network access providing access to the wired network for the one or more first wireless nodes, the first network access point providing a first Internet Protocol (IP) address to a first wireless node of the one or more first wireless nodes; and
a second wireless network comprising a second network access point and one or more second wireless nodes, the second network access point being directly coupled to the wired network, the second network access providing access to the wired network for the one or more second wireless nodes,
wherein message information received at the first wireless network and address to the first IP address is forwarded from the first wireless network to the second wireless network via a wireless internetwork path when the first wireless node establishes communication with the second wireless network,
wherein the wireless internetwork path comprises a wireless connection between at least one of the one or more first wireless nodes or at least one of the one or more second wireless nodes,
wherein the wireless internetwork path excludes the first network access point and the second network access point,
wherein the wireless internetwork path is defined, at least in part, upon a connectivity advertisement broadcast by a second wireless node of the one or more second wireless nodes,
wherein a wireless mobile communication device roams out of a wireless coverage area of the first network and into a wireless coverage area of the second network, and
wherein the mobile wireless communication device determines the wireless internetwork path over which communications can be routed from the first network access point.

10. The data communication system according to claim 9, wherein the wireless internetwork path comprises an internetworking node included within the one or more first wireless nodes and within the one or more second wireless nodes.

11. The data communication system according to claim 9, wherein the first wireless node determines the wireless internetwork path based, at least in part, on the connectivity advertisement and an additional connectivity advertisement broadcast by a particular first wireless node of the one or more first wireless nodes.

12. A method of data communication, comprising:
broadcasting, from a first node of one or more first nodes included within a first wireless network, a connectivity advertisement identifying its address and one or more additional addresses corresponding to at least one of the one or more first nodes;
roaming, by a mobile wireless communication device, from a wireless coverage area of the first wireless network and into a wireless coverage area of a second wireless network;
determining, by the mobile wireless communication device, a wireless internetwork path based, at least in part, on the connectivity advertisement, the wireless internetwork path comprising one or more wireless connections involving at least one of the one or more first nodes or at least one of one or more second nodes of a second wireless network;
excluding, from the wireless internetwork path, a first network access point associated with the first wireless network and a second network access point associated with the second wireless network; and
forwarding, from the first wireless network to the second wireless network via the wireless internetwork path, message information received at the first network and addressed to the mobile wireless communication device.

13. The method according to claim 12, comprising:
receiving, at an internetworking node included within the one or more first nodes and the one or more second nodes, a first set of network information relating to the first network, the first set of network information identifying the first network access point and where the message information is available from the first wireless network.

14. The method according to claim 13, comprising:
transmitting, to a second node of the one of more second nodes, the first set of network information and an identity of the internetworking node.

15. The method according to claim 14, comprising:
broadcasting, from the second node of the one or more second nodes, the first set of network information.

16. The method according to claim 15, comprising:
receiving, at a particular first node of the one or more first nodes, the first set of network information broadcast by the second node of the one or more second nodes.

17. A method for data communication, comprising:
associating an access point and one or more first wireless nodes with a first wireless network, the access point being directly coupled to a wired network, the access point and the one or more first wireless nodes being wirelessly coupled, the access point providing access to the wired network for the one or more first wireless nodes;
receiving, at a mobile wireless communication device disposed in a wireless coverage area of the first wireless network, a first IP address;
terminating, at the mobile wireless communication device, a first network connection with the first wireless network;
roaming, by the mobile wireless communication device, from the wireless coverage area of the first wireless network and into a wireless coverage area of a second wireless network;
determining that a signal strength over the first network connection is below a minimum threshold;
establishing a second network connection with a second wireless network;
determining, by the mobile wireless communication device, a wireless internetwork path comprising one or more wireless connections involving at least one of the one or more first wireless nodes and at least one of one or more second wireless nodes of the second wireless network;
excluding, from the wireless internetwork path, a first network access point of the first wireless network and a second network access point of the second wireless network; and
receiving, at the mobile wireless communication device, message information forwarded from the access point to the mobile wireless communication device via the wireless internetwork path.

18. The method according to claim 17, wherein the first wireless node determines the wireless internetwork path comprising the one or more wireless connections.

19. The method according to claim 17,
wherein the message information is received at the first wireless network before being received at the first wireless node, and
wherein the message information is addressed to the first IP address.

20. The method according to claim 17, wherein the determination of the wireless internetwork path is based, at least in part, on a connectivity advertisement broadcast by a second wireless node of the one or more second wireless nodes.

21. The method according to claim 20, wherein the determination of the wireless internetwork path is based, at least in part, on an additional connectivity advertisement broadcast by a particular wireless node of the one or more first wireless nodes.

* * * * *